United States Patent [19]

Doyon

[11] Patent Number: 5,558,948
[45] Date of Patent: Sep. 24, 1996

[54] FUEL CELL ANODE AND FUEL CELL

[75] Inventor: Joel D. Doyon, Bantam, Conn.

[73] Assignee: Energy Research Corporation, Danbury, Conn.

[21] Appl. No.: 336,870

[22] Filed: Nov. 9, 1994

[51] Int. Cl.⁶ .................................................. H01M 4/02
[52] U.S. Cl. .................. 429/40; 429/16; 429/41; 429/44; 429/45; 429/46; 429/235; 429/241; 429/245; 29/623.3
[58] Field of Search .................... 429/16, 40, 41, 429/44, 218, 45, 46, 235, 223, 241, 245; 29/623.3; 75/246; 419/40; 502/101

[56] References Cited

U.S. PATENT DOCUMENTS

| | | | |
|---|---|---|---|
| 4,476,002 | 10/1984 | Howard et al. | 204/283 |
| 4,481,128 | 11/1984 | Jackovitz et al. | 252/182.1 |
| 4,554,225 | 11/1985 | Sounai et al. | 429/34 |
| 4,659,379 | 4/1987 | Singh et al. | 75/234 |
| 4,797,379 | 1/1989 | Patel et al. | 502/101 |
| 5,041,159 | 8/1991 | Doyon et al. | 75/232 |
| 5,229,221 | 7/1993 | Donado et al. | 429/13 |
| 5,354,627 | 10/1994 | Hatoh et al. | 429/40 |

FOREIGN PATENT DOCUMENTS 4030945  4/1992  Germany .

OTHER PUBLICATIONS

Niikura, J. et al., In–Cell Sintering Process for MCFC, Extended Abstract, 1992 Fuel Cell Seminar, Tucson, Arizona. (month N/A).

Patent Abstracts of Japan No. JP60154467, published Aug. 14, 1985, Vol. 009, No. 321, (Matsushita Denki Sangyo KK).

Patent Abstracts of Japan No. JP60154464, published Aug. 14, 1985, Vol. 009, No. 321 (Toshiba KK).

Extended Abstracts Vol. 93/1, Jan. 1, 1993, pp. 1558/1559, XP 000421799, Wendt, et al., "Materials Problems and Fabrication Technologies of Molten Carbonate Fuel Cell Anodes".

Primary Examiner—M. Nuzzolillo
Attorney, Agent, or Firm—Robin, Blecker, Daley & Driscoll

[57] ABSTRACT

A nickel anode electrode component comprised of a support member and a porous coherent member formed from a non-sintered nickel alloy constituent. The support member and porous coherent member are laminated together and the nickel anode electrode component is assembled within a fuel cell and formed into an anode electrode in situ within the cell.

40 Claims, 5 Drawing Sheets

FUEL CELL ANODE AND FUEL CELL

BACKGROUND OF THE INVENTION

This invention relates to an anode for a fuel cell and, in particular, to an anode for a fuel cell comprised of a nickel alloy material.

Anode electrodes comprised of nickel alloy material are used in molten carbonate fuel cells. These so-called "nickel anodes" when suitably fabricated provide increased resistance to creepage, thereby helping to preserve fuel cell performance and life. Fabrication procedures for nickel anodes are disclosed in U.S. Pat. No. 5,041,159, assigned to the same assignee hereof and the teachings of which are incorporated herein by reference.

In a standard process for fabricating nickel anodes, a porous cohesive member comprised of a nickel alloy constituent is first formed. This is preferably accomplished by tape casting the member using a slurry containing the nickel alloy constituent. Typical alloy materials for the nickel alloy constituent might be aluminum, yttrium, magnesium, titanium, tantalum, molybdenum, chromium and cerium.

After tape casting, the porous cohesive member is subjected to a sintering procedure in which the nickel alloy constituent is sintered and selectively oxidized. Sintering is accomplished by subjecting the member to elevated temperatures in a preselected atmosphere. A typical temperature range for the elevated temperature might be 800° C. to 1100° C. and a typical atmosphere might be an atmosphere comprised of water and hydrogen in amounts providing partial pressures of the gases in a range of 25:1 to 110:1.

Following the sintering process, the sintered member is then subjected to a filling process in which the pores of the member are partially filled with a preselected amount of electrolyte material. This completes the anode electrode fabrication and the completed electrode is then assembled with other elements, including a cathode electrode element and an electrolyte tile, to form a complete fuel cell.

In the aforesaid anode electrode fabrication, the process of forming the metal alloy slurry and the processes of sintering the cohesive porous member and filling the sintered member with electrolyte are batch processes. Accordingly, the processes are costly to carry out, since each process has yield associated losses. Additionally, the sintering process results in a fragile sintered member whose thickness must be kept at or above a minimum value, typically 18 mils, to realize acceptable yields. This increases the anode material required, which adds to the overall cost of the anode.

In order to eliminate certain of these batch processes, it has been proposed to carry out the sintering and filling processes, in situ, i.e., within the fuel cell. With this method, the tape cast cohesive member is appropriately assembled in the fuel cell in the anode electrode location and the fuel cell operated. This causes the cohesive member to be subjected to an elevated temperature and to a water and hydrogen atmosphere sufficient to sinter and oxidize its nickel alloy constituent and to partially fill the pores of the sintered structure with electrolyte. While this provides the desired nickel anode electrode structure, certain undesirable effects such as, for example, unwanted sagging of the cohesive member, have been found to occur. These effects result in loss of contact and increased resistance for the anode electrode which over time, can seriously degrade fuel cell performance.

It is therefore an object of the present invention to provide a nickel anode electrode component which results in an anode electrode which does not suffer from the above disadvantages.

It is a further object of the present invention to provide a nickel anode electrode component meeting the above objective and which can be formed into an anode electrode in situ in a fuel cell.

It is a further object of the present invention to provide a method for fabricating a nickel anode electrode component meeting the aforementioned objectives.

It is yet a further object of the present invention to provide a fuel cell having a nickel anode electrode component which meets the previously mentioned objectives.

SUMMARY OF THE INVENTION

In accordance with the principles of the present invention, the above and other objectives are realized in a nickel anode electrode component comprised of a porous cohesive member and a support plate to which the cohesive member is laminated. The porous cohesive member is formed from a nickel alloy constituent which is non-sintered.

The nickel anode electrode component so fabricated is assembled with other elements into a fuel cell. Operation of the fuel cell sinters and oxidizes the nickel alloy constituent of the porous cohesive member and also results in electrolyte partially filling the pores of the sintered member. This provides in situ completion of the anode electrode.

Preferably, the support member of the nickel anode electrode component is a metallic member having a plurality of through openings each having a size which is within the range of 0.005 to 0.030 of an inch. Also, preferably, the thickness of the nickel anode electrode component is within a range of 0.005 to 0.025 of an inch. It is likewise preferable that the laminating procedure be carried out with an applied pressure in the range of 1000 to 3000 psi and that it result in the support member being embedded in the cohesive member by an amount which is in the range of 0.0005 to 0.005 of an inch.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
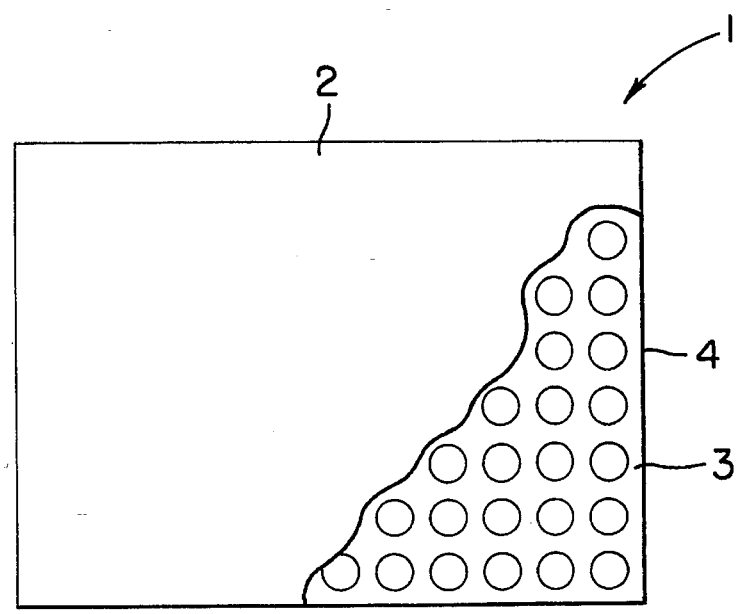
FIG. 1 shows a nickel anode electrode component in accordance with the principles of the present invention.

FIG. 1 shows a fuel cell anode electrode component 1 in accordance with the principles of the present invention. As shown, the component 1 includes a porous cohesive member 2 which is laminated to a support member 3.

The porous cohesive member 2 comprises a non-sintered nickel alloy constituent. Typical alloys for the non-sintered nickel alloy constituent might be aluminum, yttrium, magnesium, titanium, tantalum, molybdenum, chromium and cerium. The support member 3 comprises a metallic material. Typical metallic materials might be nickel, copper or other similar corrosion resistant materials.

Figure 1A:
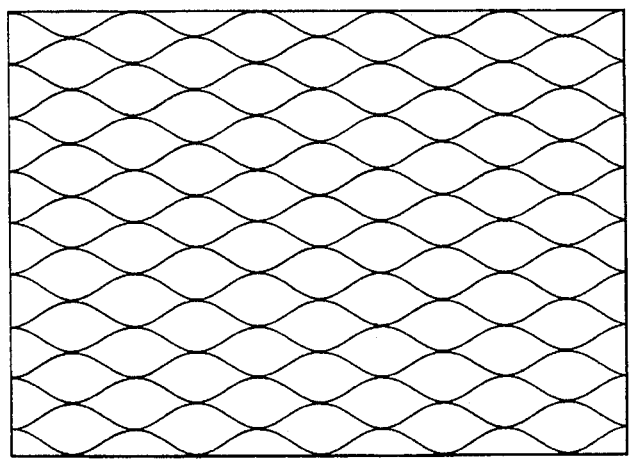
FIG. 1A shows a further type of support member usable with the nickel anode electrode component of FIG. 1.

The support member 3 also includes through openings 4 each of which preferably has a size in the range of 0.005 to 0.030 of an inch. In the case of FIG. 1, the support member 3 is in the form of a plate with the openings 4 formed by perforations in the plate. Alternately, the member 3 can be formed as an expanded member having interruptions to form the through openings. Such a member is illustrated in FIG. 1A.

The overall thickness of the component 1 formed by the lamination of the porous cohesive member 2 and support member 3 is, preferably, in the range of 0.005 to 0.025 of an inch. Of this thickness, the thickness of the member 2 is in a range of 0.003 to 0.015 of an inch.

The member 2 and overall anode electrode component 1 are thus of relatively thin configuration. The ability to utilize a thin member 2 decreases the amount of nickel alloy constituent required to form the anode component 1, thereby reducing its overall cost.

As a result of the pressure applied during the lamination process, the support member 3 extends into the porous cohesive member 2 by an amount which is in the range of 0.0005 to 0.005 of an inch. This results in an effective adherence or securement of the members together during the in situ formation of the component 1 into an anode electrode of a fuel cell.

Figure 2:
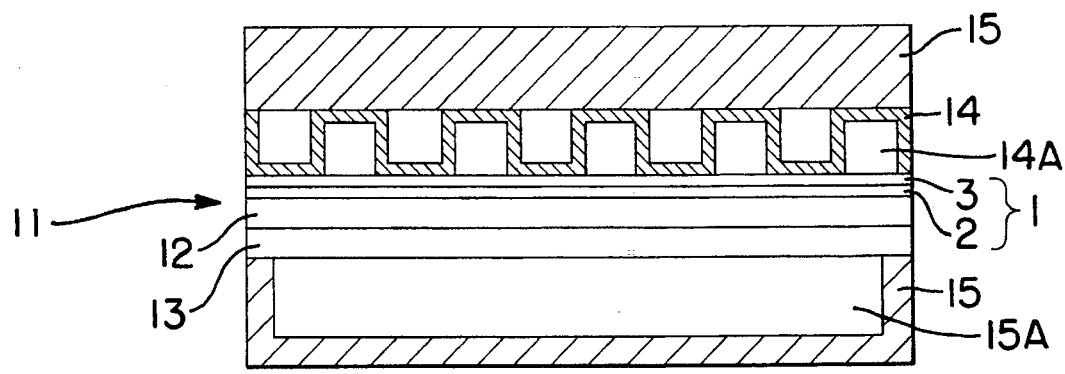
FIG. 2 shows the nickel anode electrode component of FIG. 1 assembled into a fuel cell.

FIG. 2 shows the nickel anode electrode component 1 assembled with other elements to form a fuel cell 11, shown as a high temperature carbonate type fuel cell. The cell 11 includes an electrolyte tile 12 whose one face abuts the porous cohesive member 2 of the anode electrode component 1 and whose other face abuts a cathode electrode 13. A separator plate 15 abuts the peak regions of a corrugated current collector plate 14 whose valley regions abut the support member 3 of the anode component 1. A similar cathode current collector plate 15 with transverse corrugations abuts the cathode electrode component 13. The passages 14A and 15A defined by the plates 14 and 15 carry fuel and oxidant gas to the cell 11.

As above-indicated, the nickel anode electrode component 1 is formed into a completed nickel anode electrode in the cell 11, i.e., in situ, by initial operation of the cell. During such operation, the temperature of the cell becomes elevated, i.e., rises to above 600° C., and a mixture of gases (hydrogen, carbon dioxide and water) is produced adjacent the anode electrode component. These conditions of the cell, when maintained over a period of time, are sufficient to result in sintering and oxidizing of the nickel alloy constituent of the porous coherent member 2 of the anode component 1. They also result in the sintered component having its pores partially filled with electrolyte from the tile 12 which becomes molten at the operating temperature of the cell. This transforms the anode component 1 into a completed anode electrode.

More particularly, the elevated temperature of the fuel cell 11 is above the Tamman temperature for nickel, i.e., above about 586° C., which is the approximate temperature at which particulate nickel begins to sinter. Also, at this temperature, as above-indicated, the electrolyte tile is molten so that liquid phase sintering takes place which enhances the nickel sintering significantly. Additionally, the oxygen partial pressure in the fuel cell gas composition as determined by the water to hydrogen ratio is sufficient to internally oxidize the dispersed alloy in the nickel alloy constituent of the porous coherent member 2. Once this occurs, the continued heating sinters the nickel alloy constituent and an anode electrode in the form of a porous plaque partially filled with electrolyte results.

The anode electrode so formed is found to exhibit creep stabilization and resistance to deformation. The latter characteristic is, in part, attributable to the support member 3 which prevents particle flow of the alloy constituent of the coherent member 2 during the oxidation and sintering.

More particularly, it is believed that the porous coherent member 2 during in situ formation, has the tendency to undergo particle flow and rearrangement after burnout of the organic binders in the member. This occurs during the temperature rise of the fuel cell and prior to sintering. These effects, as opposed to creep, are believed to cause the resultant anode electrode to deform during use of the fuel cell.

With the present anode electrode component 1, this flow and rearrangement of the nickel alloy constituent of the member 2 is significantly reduced owing to lamination of the member 2 to the support member 3. Moreover, the relatively small through openings 4 of the member 3 are further believed to enhance adherence and embedment of the member 3 into the member 2. This promotes less thickness change in the resultant in situ formed anode electrode.

Figure 3:
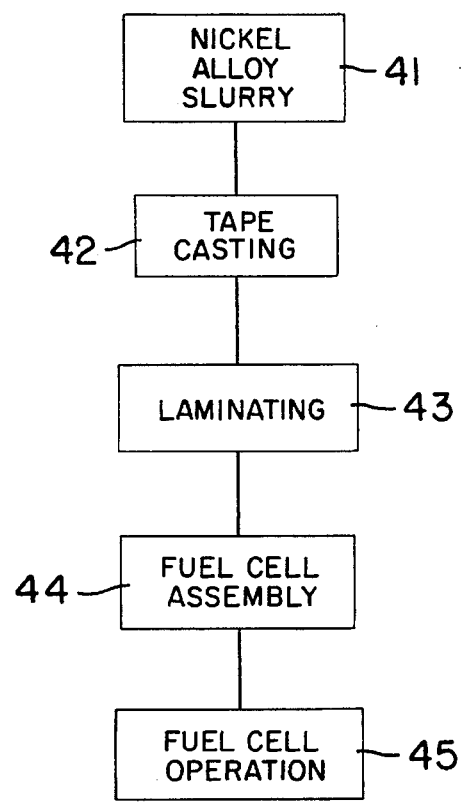
FIG. 3 shows the processing steps for making the nickel anode electrode component of FIG. 1 and for transforming the component into an anode electrode.

FIG. 3 shows the above-described process steps for the anode electrode formation. First, in step 41 a slurry of the nickel alloy constituent is formed. In step 42, the slurry is tape cast to produce the porous coherent member 2. The member 2 and support member 3 are then subjected to a lamination step 43 which results in the nickel anode electrode component 1.

The component 1 is then assembled into the fuel cell 1 at step 44. The fuel cell 11 is then operated at step 45 to transform the component 1 into the anode electrode of the cell.

Figure 4:
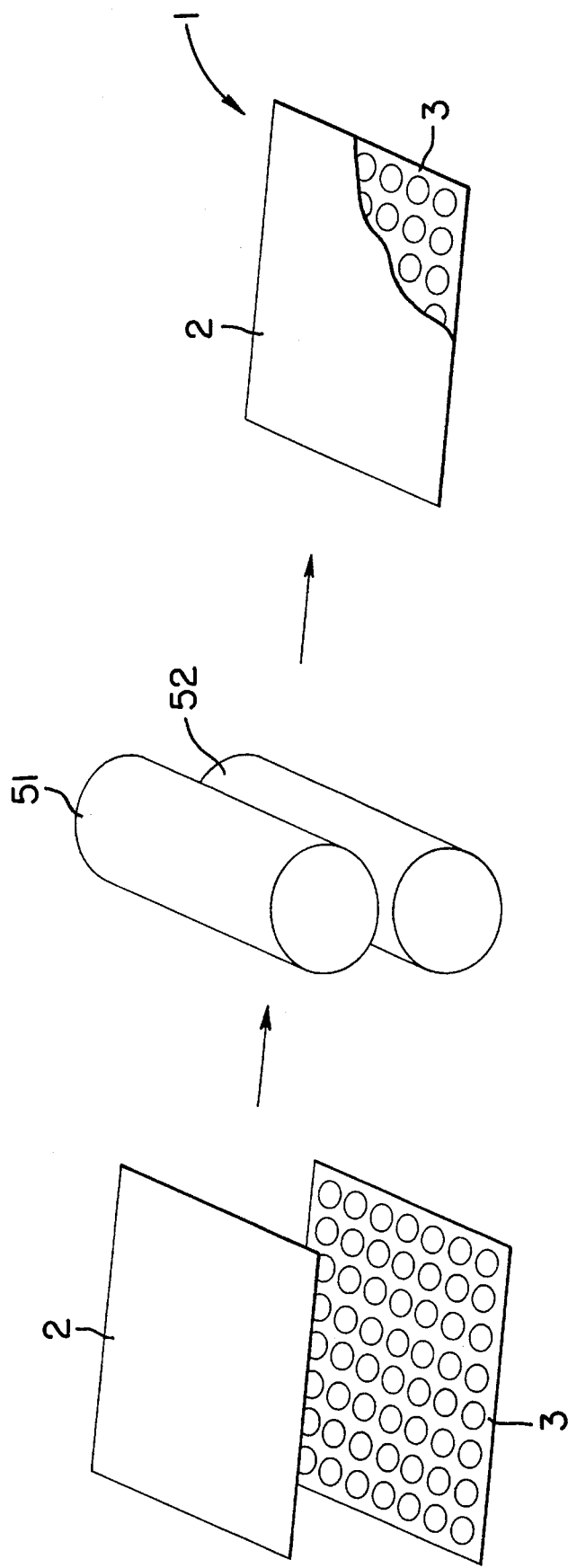
FIG. 4 shows schematically equipment for carrying out the laminating process of FIG. 1.

The lamination step 43 in the process of FIG. 3 can be carried out in a number of ways. As shown in FIG. 4, the porous coherent member 2 and support member 3 are laminated using two facing rollers 51 and 52. The members 2 and 3 are passed into the nip of these rollers so that the members are pressed together under high pressure. Preferably, this pressure is in the range of 1000 to 3000 psi. The use of the rollers 51 and 52 provides greater embedment of the support member 3 into the coherent member 2. Other laminating techniques might include using a press to press the members 2 and 3 together under high pressure.

Figure 5:
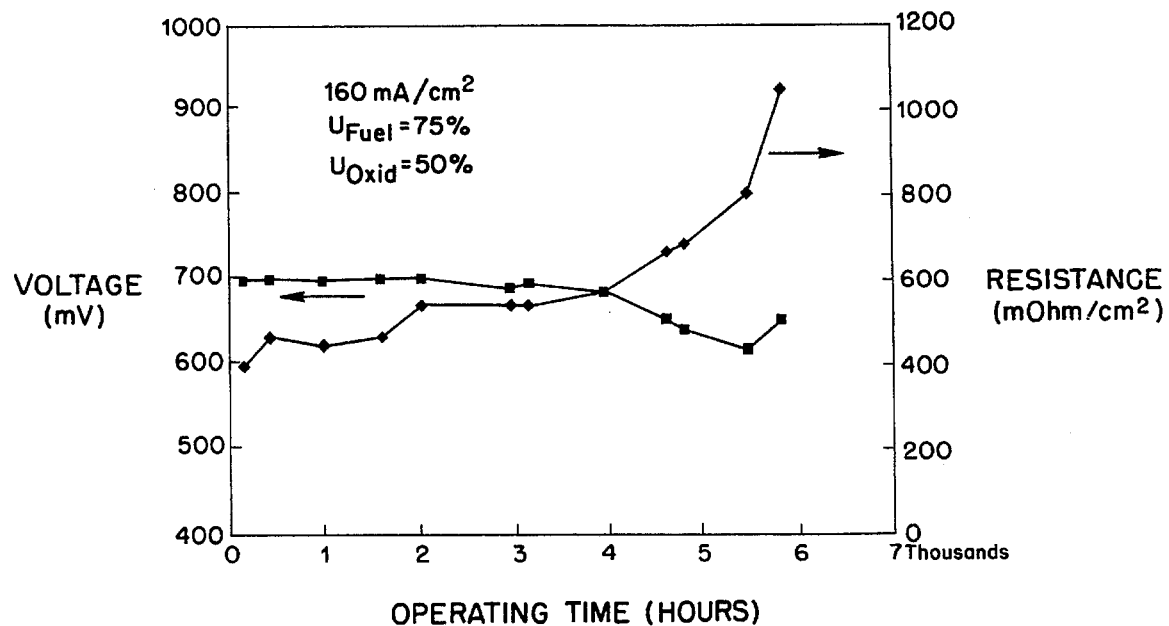
FIGS. 5 and 6 show the operating characteristics of single cell fuel cells constructed with the nickel anode electrode component of FIG. 1.
Figure 6:
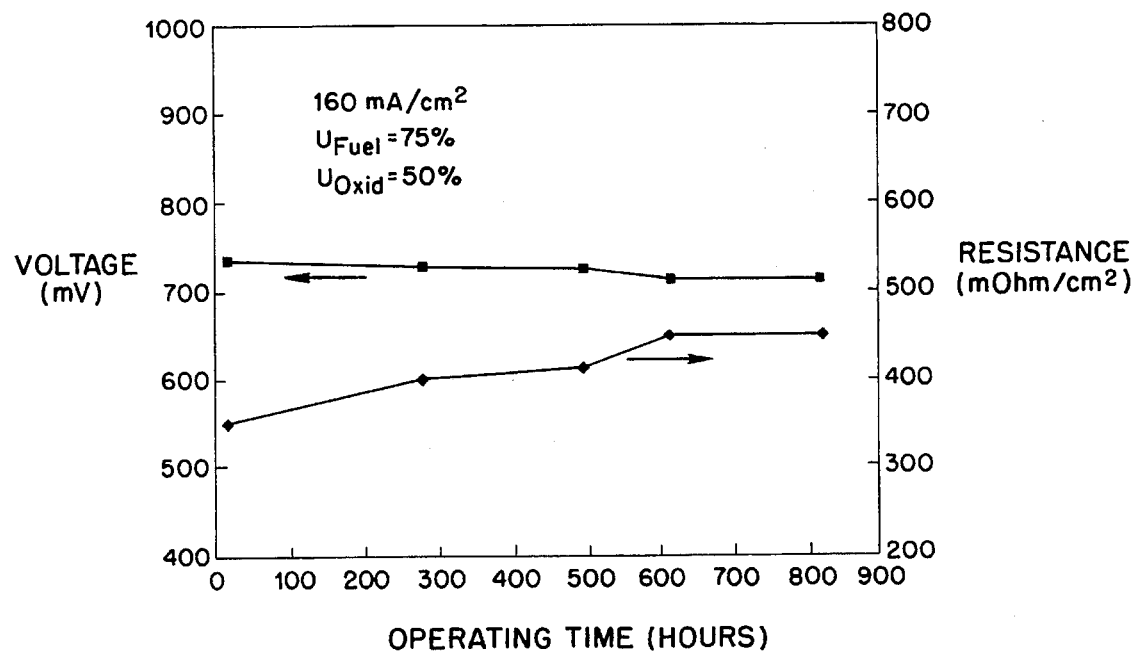

FIGS. 5 and 6 show the operating characteristics of two single cell fuel cells assembled with a nickel anode electrode component in accordance with the invention. As can be seen, the cell of FIG. 5 operated continuously for almost 6000 hours with very stable performance over the first 4000 hours. The cell of FIG. 6 also showed very little performance decay (less than 10 mV) for 800 hours of continuous operation. Upon disassembly of these cells, both were found to exhibit little anode deformation of the anode plaque into the support member beyond the 0.001 of an inch due to the laminated construction.

Figure 7:
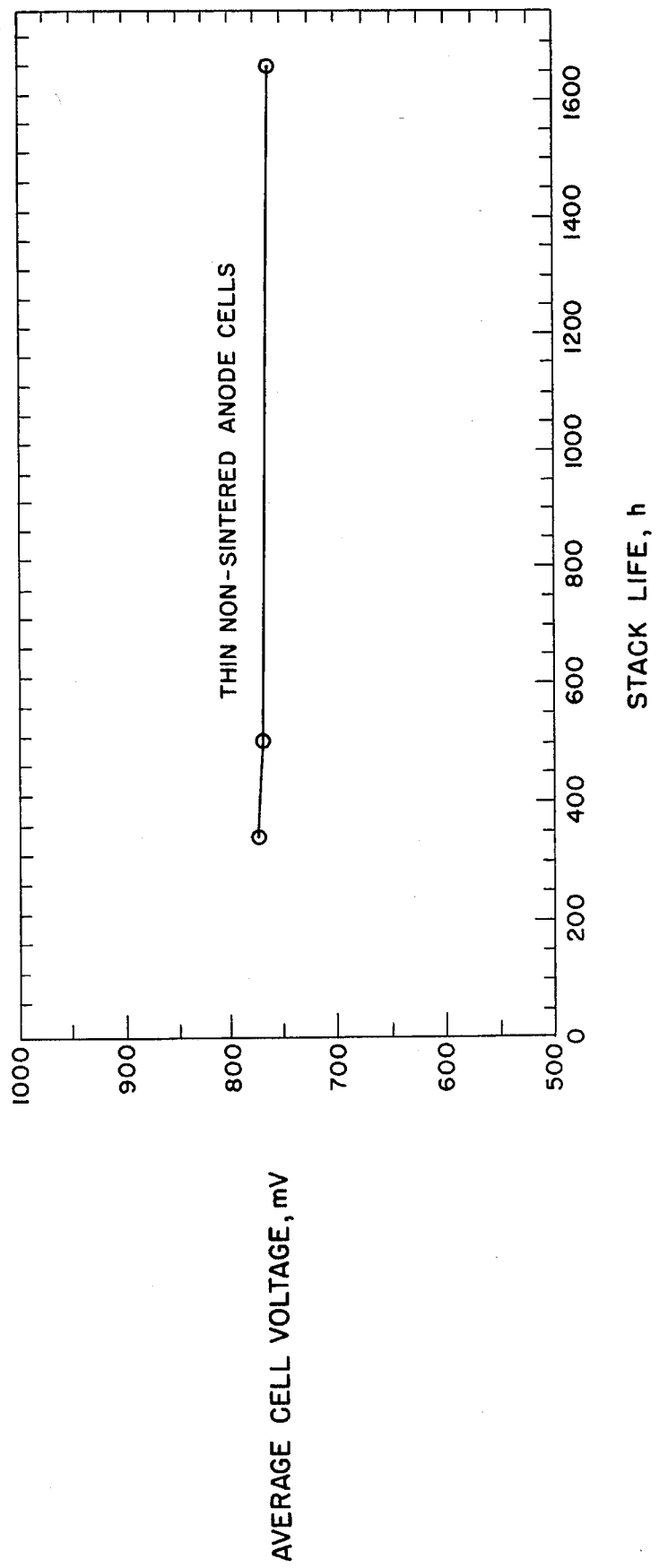
FIG. 7 shows the operating characteristics of a large area (5500 cm$^2$) fuel cell stack utilizing fuel cells constructed as shown in FIG. 2.

A large area (5500 cm$^2$) stack of six fuel cells with anode electrodes formed in accordance with the invention were assembled and the performance characteristic of this cell is shown in FIG. 7. As can be seen, stable operation for the fuel cell stack was realized for approximately 1700 hours of continuous operation.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention.

What is claimed is:

1. A method comprising the steps of:

providing a porous cohesive member formed of a nickel alloy constituent, said porous cohesive member being formed when separate from a support member to which said cohesive member is to be laminated, and said step of providing being carried out such that said nickel alloy constituent of said porous cohesive member is non-sintered; and laminating said porous cohesive member to said support member to form a nickel anode electrode component, said laminating including bringing said porous cohesive member and said support into contact under pressure of at least about 1000 psi.

2. A method in accordance with claim 1 further comprising:

assembling said nickel anode electrode component with other elements to form a fuel cell;

and operating said fuel cell to sinter said nickel alloy constituent of said porous cohesive member of said nickel anode electrode component.

3. A method in accordance with claim 2 wherein:

said operating of said fuel cell selectively oxidizes said nickel alloy constituent of said porous cohesive member of said nickel anode electrode component.

4. A method in accordance with claim 3 wherein:

said operating of said fuel cell is such as to expose said nickel alloy constituent of said porous cohesive member of said nickel anode electrode component to an elevated temperature and to a gaseous atmosphere.

5. A method in accordance with claim 4 wherein:

said gaseous atmosphere includes a mixture of water and hydrogen at preselected partial pressures.

6. A method in accordance with claim 1 wherein:

said support member includes a plurality of through openings.

7. A method in accordance with claim 6 wherein:

each of said through openings is of a size within a range of 0.005 to 0.030 of an inch.

8. A method in accordance with claim 7 wherein:

said support member comprises a metallic plate having perforations forming said through openings.

9. A method in accordance with claim 7 wherein:

said nickel anode electrode component has a thickness within a range of 0.005 to 0.025 of an inch.

10. A method in accordance with claim 1 wherein:

said bringing of said porous cohesive member and said support member into contact under pressure is carried out by passing said porous cohesive member and said support member between two spaced rollers.

11. A method in accordance with claim 1 wherein:

said pressure is in a range of 1000 to 3000 psi.

12. A method in accordance with claim 1 wherein:

said laminating causes said support member to be partially embedded in said porous cohesive member.

13. A method in accordance with claim 12 wherein:

said support member extends into said porous cohesive member for a distance within a range of 0.0005 to 0.005 of an inch.

14. A method in accordance with claim 1 wherein:

said step of providing includes forming said nickel alloy constituent into said porous cohesive member.

15. A method in accordance with claim 14 wherein:

said forming step comprises tape casting said nickel alloy constituent to form said porous cohesive member.

16. A method in accordance with claim 1 wherein:

said alloy of said nickel alloy constituent is one of aluminum, yttrium, magnesium, titanium, tantalum, molybdenum, chromium and cerium.

17. A method in accordance with claim 16 wherein:

said support material comprises a metallic material.

18. Apparatus for use with a fuel cell comprising:

a nickel anode electrode component including: a support member; and a porous cohesive member comprised of a nickel alloy constituent laminated to said support member, said porous cohesive member having been formed when separate from said support member and such that said nickel alloy constituent is non-sintered, and said porous cohesive member then having been laminated to said support member by bringing said porous cohesive member and said support member into contact under a pressure of at least about 1000 psi.

19. Apparatus in accordance with claim 18 wherein:

said nickel anode electrode component has a thickness within a range of 0.005 to 0.025 of an inch.

20. Apparatus in accordance with claim 18 wherein:

said support member is partially embedded in said porous cohesive member.

21. Apparatus in accordance with claim 20 wherein:

said support member extends into said porous cohesive member for a distance within a range of 0.0005 to 0.005 of an inch.

22. Apparatus in accordance with claim 20 wherein:

said nickel anode electrode component has a thickness within a range of 0.005 to 0.025 of an inch; and said support member has through openings each of which is of a size within a range of 0.005 to 0.030 of an inch.

23. Apparatus in accordance with claim 22 wherein:

said support member is partially embedded in said porous cohesive member so as to extend into said porous cohesive member for a distance within a range of 0.0005 to 0.005 of an inch.

24. Apparatus in accordance with claim 20 wherein:

said support member has a plurality of through openings.

25. Apparatus in accordance with claim 20 wherein:

each of said through openings is of a size within a range of 0.005 to 0.030 of an inch.

26. Apparatus in accordance with claim 24 wherein:

said support member comprises one of a metallic plate having perforations forming said through openings and an expanded metallic plate having interruptions forming said through openings.

27. Apparatus in accordance with claim 20 wherein:

said alloy of said nickel alloy constituent is one of aluminum, yttrium, magnesium, titanium, tantalum, molybdenum, chromium and cerium.

28. A fuel cell comprising:

a nickel electrode component including: a support plate; and a porous cohesive member comprised of a nickel alloy constituent laminated to said support plate, said porous cohesive member having been formed when separate from said support member and such that said nickel alloy constituent is non-sintered and said porous cohesive member then having been laminated to said support member by bringing said porous cohesive member and said support member into contact under a pressure of at least about 1000 psi.

29. A fuel cell in accordance with claim 28 wherein:

said nickel alloy constituent of said porous cohesive member is non-sintered prior to operation of said fuel cell;

and said nickel alloy constituent of said porous cohesive member becomes sintered subsequent to operation of said fuel cell.

30. A fuel cell in accordance with claim 28 further comprising:

a cathode element;

and an electrolyte tile.

31. A fuel cell in accordance with claim 30 wherein:

said electrolyte is a carbonate electrolyte.

32. A fuel cell in accordance with claim 29 wherein:

said nickel anode electrode component has a thickness within a range of 0.005 to 0.025 of an inch.

33. A fuel cell in accordance with claim 29 wherein:

said support member is partially embedded in said porous cohesive member.

34. A fuel cell in accordance with claim 33 wherein:

said support member extends into said porous cohesive member for a distance within a range of 0.0005 to 0.005 of an inch.

35. A fuel cell in accordance with claim 29 wherein:

said nickel anode electrode component has a thickness within a range of 0.005 to 0.025 of an inch; and said support member has through openings each of which is a size in a range of 0.005 to 0.030 of an inch.

36. A fuel cell in accordance with claim 35 wherein:

said support member is partially embedded in said porous cohesive member so as to extend within said porous cohesive member for a distance in a range of 0.0005 to 0.005 of an inch.

37. A fuel cell in accordance with claim 29 wherein:

said support member has a plurality of through openings.

38. A fuel cell in accordance with claim 37 wherein:

each of said through openings is of a size within a range of 0.005 to 0.030 of an inch.

39. A fuel cell in accordance with claim 37 wherein:

said support member comprises one of a metallic plate having perforations forming said through openings and an expanded metallic plate having interruptions forming said through openings.

40. A method in accordance with claim 7, wherein:

said support member comprises an expanded metallic plate having interruptions forming said through openings.

* * * * *